(12) United States Patent
Lv et al.

(10) Patent No.: US 9,716,550 B2
(45) Date of Patent: Jul. 25, 2017

(54) DIMMING METHOD, DIMMING DEVICE AND COMPUTER STORAGE MEDIUM

(71) Applicant: ZTE Corporation, Shenzhen, Guangdong (CN)

(72) Inventors: Ning Lv, Shenzhen (CN); Zhou Zhi, Shenzhen (CN); Zhong Yu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 15/108,630

(22) PCT Filed: Jun. 18, 2014

(86) PCT No.: PCT/CN2014/080227
§ 371 (c)(1),
(2) Date: Jun. 28, 2016

(87) PCT Pub. No.: WO2015/100961
PCT Pub. Date: Jul. 9, 2015

(65) Prior Publication Data
US 2016/0329962 A1    Nov. 10, 2016

(30) Foreign Application Priority Data
Dec. 30, 2013  (CN) .......................... 2013 1 0746971

(51) Int. Cl.
*H04B 10/116*    (2013.01)
*H04L 12/46*    (2006.01)

(52) U.S. Cl.
CPC ........ *H04B 10/116* (2013.01); *H04L 12/4633* (2013.01); *H04L 12/46* (2013.01)

(58) Field of Classification Search
None
See application file for complete search history.

(56) References Cited

U.S. PATENT DOCUMENTS 5,611,038 A    3/1997 Shaw
6,928,289 B1    8/2005 Cho
(Continued)

FOREIGN PATENT DOCUMENTS

CN    1898912 A    1/2007
CN    101010913 A    8/2007
(Continued)

OTHER PUBLICATIONS

Int. Search Report cited in PCT Application No. PCT/CN2014/080227 dated Oct. 8, 2014, 6 pgs.
(Continued)

*Primary Examiner* — Kodzovi Acolatse
(74) *Attorney, Agent, or Firm* — Cooper Legal Group, LLC (57) ABSTRACT

Disclosed are a dimming method, a dimming device and a computer storage medium. The method comprises: segmenting, on a Media Access Control (MAC) layer, a MAC Service Data Unit (MSDU) into multiple sub-MSDUs of the same length; encapsulating the sub-MSDUs after the segmentation into separate MAC Protocol Data Units (MPDUs), and separately generating a Compensation Frame (CF) for each MPDU according to a target brightness value of a light source; and aggregating the MPDUs and the CFs into a Physical Layer Service Data Unit (PSDU) of a Physical Layer Protocol Data Unit (PPDU) and transmitting the PPDU.

15 Claims, 4 Drawing Sheets (56) References Cited

U.S. PATENT DOCUMENTS

| | | |
|---|---|---|
| 7,433,314 B2 | 10/2008 | Sharma |
| 7,961,657 B2 | 6/2011 | Cave |
| 2005/0265371 A1 | 12/2005 | Sharma |
| 2006/0029099 A1 | 2/2006 | Jang |
| 2006/0056443 A1 | 3/2006 | Tao |
| 2007/0104162 A1 | 5/2007 | Kneckt |
| 2007/0291793 A1 | 12/2007 | Jang |
| 2008/0137573 A1 | 6/2008 | Cave |
| 2011/0026917 A1* | 2/2011 | Li ................. H04W 76/028 398/1 |
| 2011/0161076 A1 | 6/2011 | Davis |
| 2011/0205945 A1 | 8/2011 | Cave |
| 2011/0305176 A1 | 12/2011 | Wentink |
| 2013/0071107 A1* | 3/2013 | Kwon ............. H04B 10/516 398/25 |
| 2013/0188968 A1* | 7/2013 | Kim ................. H04B 10/50 398/182 |
| 2016/0142137 A1 | 5/2016 | Lv et al. |

FOREIGN PATENT DOCUMENTS

| | | |
|---|---|---|
| CN | 101035195 A | 9/2007 |
| CN | 101326775 A | 12/2008 |
| CN | 101558621 A | 10/2009 |
| CN | 102595494 A | 7/2012 |
| CN | 102948101 A | 2/2013 |
| EP | 1624618 A1 | 2/2006 |
| WO | 2014205926 A1 | 12/2014 |

OTHER PUBLICATIONS

Written Opinion cited in PCT Application No. PCT/CN2014/080227 dated Oct. 8, 2014, 8 pgs.

International Search Report in international application No. PCT/CN2014/080227, mailed on Oct. 8, 2014, 3 pgs.

English Translation of the Written Opinion of the International Search Authority in international application No. PCT/CN2014/080227, mailed on Oct. 8, 2014, 5 pgs.

"IEEE Standard for Local and Metropolitan Area Networks—Part 15.7: Short-Range Wireless Optical Communication Using Visible Light;IEEE Std 802.15.7-2011", Sep. 6, 2011, IEEE Standard, IEEE, Piscataway, NJ,USA, 310 pgs.

Supplementary European Search Report in European application No. 14876388.1, mailed on Dec. 9, 2016, 9 pgs.

International Search Report in international application No. PCT/2013/083764 for U.S. Pat. No. 9,509,403, mailed on Apr. 3, 2014, 2 pgs.

English Translation of the Written Opinion of the International Search Authority in international application No. PCT/2013/083764 for U.S. Pat. No. 9,509,403, mailed on Apr. 3, 2014, 5 pgs.

* cited by examiner

DIMMING METHOD, DIMMING DEVICE AND COMPUTER STORAGE MEDIUM

TECHNICAL FIELD

The disclosure relates to a dimming technology in the field of optical communications, and in particular to a dimming method, a dimming device and a computer storage medium.

BACKGROUND

A Visible Light Communication (VLC) technology refers to a technology for short-distance light wireless communication with light which is visible for human eyes and has a wavelength ranged from 400 nm to 700 nm. The VLC technology has the advantages of being immune to electromagnetic interference, being immune to interference related to a Radio Frequency (RF) system and the like, and adopting a spectrum range which falls into unlicensed spectra. When visible light is adopted for data transmission, a visible light source (such as a light-emitting diode) may be rapidly turned on and turned off or luminance of the visible light source may be modulated at a sender; and at a receiver, a modulated light signal is converted into data which may be processed by the receiver after being received.

When visible light is adopted for communication, it is necessary to ensure that there is no influence on normal use of illumination equipment by a user at the same time of implementing data transmission. Thus, the following two problems are required to be considered: the first is to realize a data transmission function; and the second is to ensure support to luminance regulation of a light source, i.e. dimming, on the premise of no flicker of the light source.

In a related technology, the following two manners are mainly adopted for dimming:

1) a sender implements dimming by virtue of an idle pattern, namely by independently sending a frame configured to regulate luminance, in an idle/receiving state, but such a manner does not provide a specific implementation solution for realizing a dimming function; and 2) in a physical layer, an idle pattern closely related to a modulation manner and a channel coding scheme is adopted for dimming, and in such a manner, luminance of a light source may be regulated to a set extent only, and the luminance of the light source may not be smoothly regulated, so that such a manner is not so flexible in dimming.

SUMMARY

The embodiment of the disclosure provides a dimming method and a dimming device, which avoid flicker of a light source at the same time of realizing a communication function and also implement flexible and user-requirement-based dimming in a VLC system.

The technical solutions of the embodiment of the disclosure are implemented as follows.

The embodiment of the disclosure provides a dimming method, including:

a Media Access Control (MAC) Service Data Unit (MSDU) is divided into multiple sub-MSDUs with an equal length in an MAC layer;

the divided sub-MSDUs are encapsulated into independent MAC Protocol Data Units (MPDUs) respectively, and a Compensatory Frames (CF) is generated for each MPDU according to a target luminance value of a light source; and each MPDU and a CF corresponding to the each MPDU are aggregated into a Physical-layer Service Data Unit (PSDU) in a Physical-layer Protocol Data Unit (PPDU), and the PPDU is transmitted.

The embodiment of the disclosure further provides a dimming device, including:

a division unit, configured to divide an MSDU into multiple sub-MSDUs with an equal length in an MAC layer;

a compensation unit, configured to encapsulate the divided sub-MSDUs into independent MPDUs respectively, and generate a CF for each MPDU according to a target luminance value of a light source;

an aggregation unit, configured to aggregate each MPDU and a CF corresponding to the each MPDU into a PSDU in a PPDU; and a light driving unit, configured to transmit the PPDU.

The embodiment of the disclosure further provides a computer storage medium having stored therein a computer-executable instruction being configured to execute the abovementioned dimming method.

The technical solutions for dimming in the embodiment of the disclosure are independent of a modulation manner and channel coding scheme adopted for data transmission, the sub-MSDUs divided in the MAC layer are encapsulated in the MPDUs, and the CF in each MPDU includes target luminance information of the light source, so that corresponding CFs may be generated for different target luminance of the light source, the shortcoming that luminance may be regulated to a set extent only in the related technology is overcome, the luminance of the light source may be smoothly regulated, and dimming flexibility is ensured.

DETAILED DESCRIPTION

The disclosure will be further described below with reference to the drawings and specific embodiments in detail, and it is important to note that the embodiments of the disclosure and characteristics in the embodiments may be combined under the condition of no conflicts.

Figure 1:
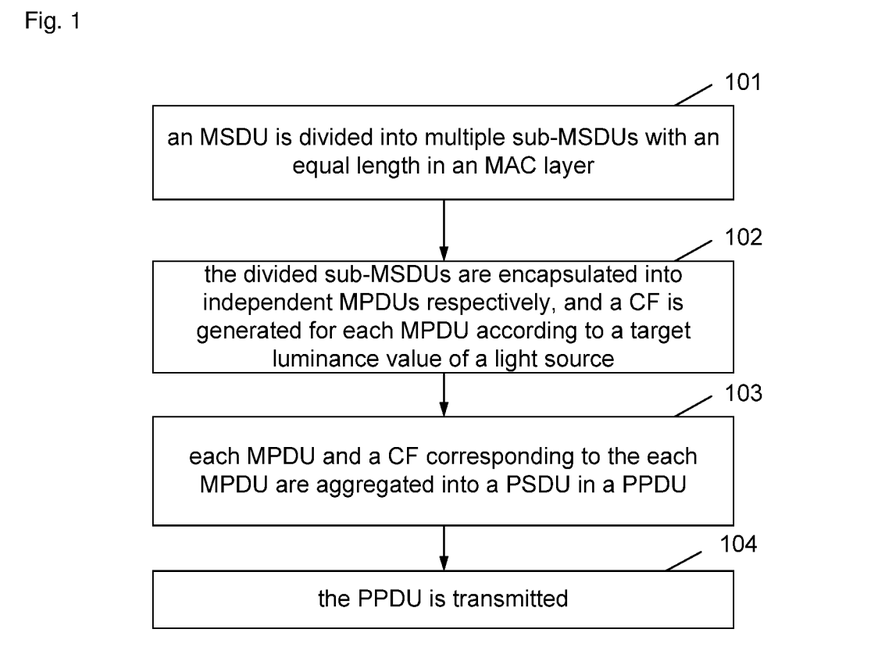
FIG. 1 is a first implementation flowchart of a dimming method according to an embodiment of the disclosure.

As shown in FIG. 1, a dimming method recorded by the embodiment of the disclosure includes the following steps:

Step 101: an MSDU is divided into multiple sub-MSDUs with an equal length in an MAC layer;

Step 102: the divided sub-MSDUs are encapsulated into independent MPDUs respectively, and CFs are generated for the MPDUs according to a target luminance value of a light source;

Step 103: each MPDU and a CF corresponding to the each MPDU are aggregated into a PSDU in a PPDU; and Step 104: the generated PPDU is transmitted.

In an embodiment, before the step that the MSDU is divided into the multiple sub-MSDUs with the equal length in the MAC layer, the method further includes:

a length of the MSDU is determined to be less than or equal to a difference value between a maximum data length and a sum of a physical layer cost length and an MAC layer cost length.

In an embodiment, the maximum data length is a product of a period T and a data rate of a link, and the period T is a reciprocal of a Critical Flicker Frequency (CFF).

In an embodiment, when the length of the MSDU is determined to be more than the difference value between the maximum data length and the sum of the physical layer cost length and the MAC layer cost length, the method further includes:

the MSDU is re-divided into multiple sub-MSDUs with an equal length until the length of each obtained sub-MSDU is determined to be less than or equal to the difference value between the maximum data length and the sum of the physical layer cost length and the MAC layer cost length.

In an embodiment, the step that the CF is generated for each MPDU according to the target luminance value of the light source includes that:

the CF is generated for each MPDU according to the target luminance value of the light source when an actual luminance value of the light source is determined to be different from the target luminance value of the light source.

In an embodiment, the step that the CF is generated for each MPDU according to the target luminance value of the light source when the actual luminance value of the light source is determined to be different from the target luminance value of the light source includes:

a length $n_{CF}$ of a sequence of a Compensatory Frame Data (CFD) part of each CF is determined according to the following formula:

$$\frac{n_{cost} + n_{MSDU} + n_{CF}}{size_{cost} + size_{MSDU} + size_{CF}} = \alpha$$

where $\alpha$ represents the target luminance value of the light source, $n_{cos\ t}$ represents the number of "1" in a cost part, $n_{MSDU}$ represents the number of "1" in the MSDU, and $n_{CF}$ represents the number of "1" in the CFD part; $size_{cost}$ represents a length of the cost part, $size_{MSDU}$ represents the length of the MSDU, and $size_{CF}$ represents a length of the CF; and cost includes a MAC-layer HeadeR (MHR) field, a MAC-layer tail field, a physical-layer preamble field, a Physical-layer HeadeR (PHR) field, a CF header field and a pad field.

In an embodiment, when the actual luminance value of the light source is determined to be the same as the target luminance value of the light source, the method further includes: the divided sub-MSDUs are encapsulated into the independent MPDUs respectively; and each MPDU is determined as the PSDU of the PPDU, and the PPDU is transmitted.

That is, the MPDU is encapsulated as a data part of the PPDU, and the PPDU encapsulated with the MPDU is transmitted.

In an embodiment, after the step that each MPDU and the CF corresponding to the each MPDU are aggregated into the PSDU in the PPDU, the method further includes:

It is determined whether a length of the PSDU obtained by aggregation is less than or equal to a difference value between the maximum data length and the physical layer cost length.

In an embodiment, when the length of the PSDU obtained by aggregation is determined to be more than the difference value between the maximum data length and the physical layer cost length, the method further includes:

the MSDU is re-divided into multiple sub-MSDUs with an equal length until the length of the PSDU obtained by aggregation according to the each obtained sub-MSDU and the CF corresponding to the each sub-MSDU is less than or equal to the difference value between the maximum data length and the physical layer cost length.

When the length of the PSDU obtained by aggregation is less than or equal to the difference value between the maximum data length and the physical layer cost length, it is indicated that the problem of light source flicker that a user may feel may not occur during data transmission.

Figure 2:
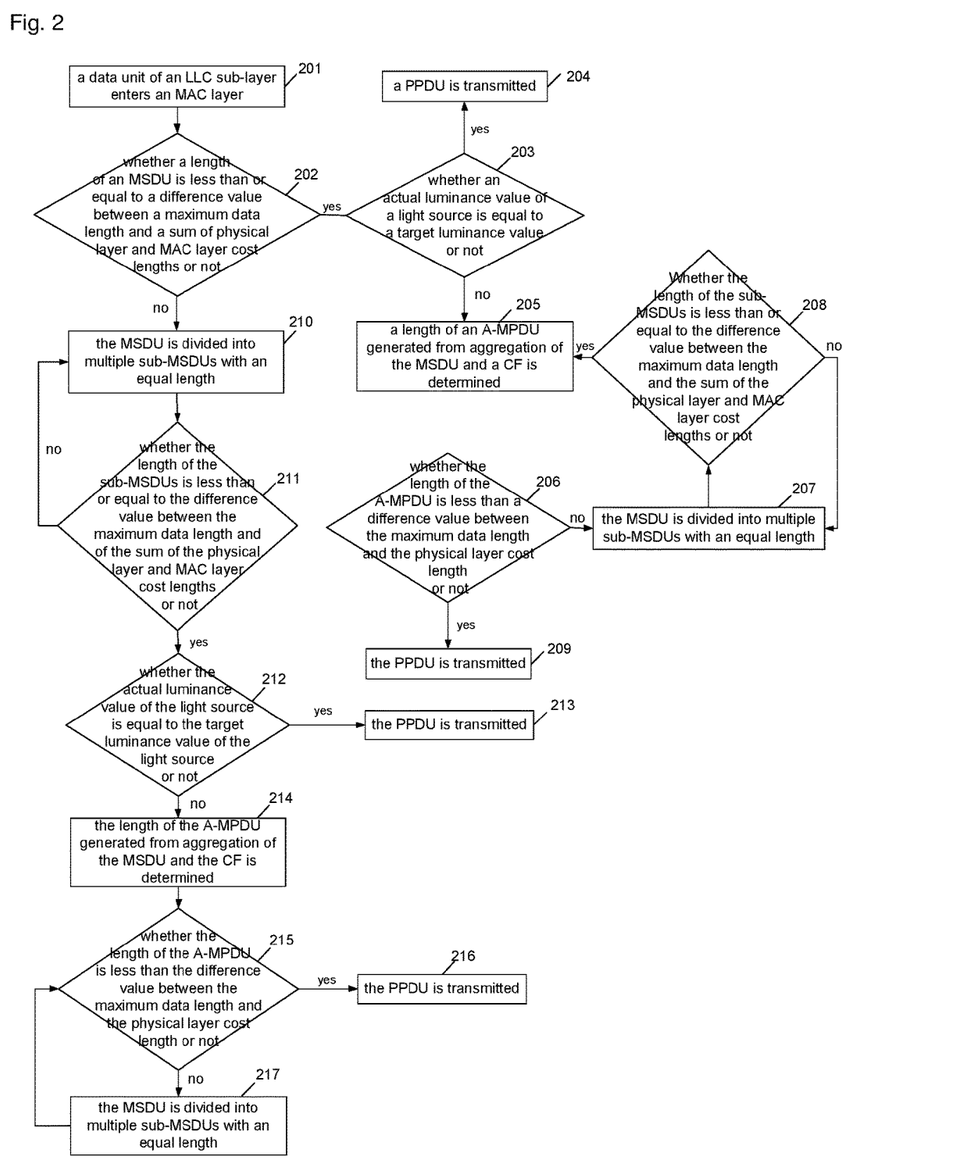
FIG. 2 is a second implementation flowchart of a dimming method according to an embodiment of the disclosure.

The dimming method provided by the embodiment of the disclosure will be further described below in detail, FIG. 2 is a second implementation flowchart of a dimming method according to an embodiment of the disclosure, and as shown in FIG. 2, the method includes the following steps:

Step 201: a data unit of a Logical Link Control (LLC) sub-layer is determined to enter an MAC layer and becomes a data part MSDU of an MPDU.

That is, when the data unit of the LLC sub-layer enters the MAC layer and becomes the data part MSDU of the MPDU, Step 202 is executed.

Figure 3:
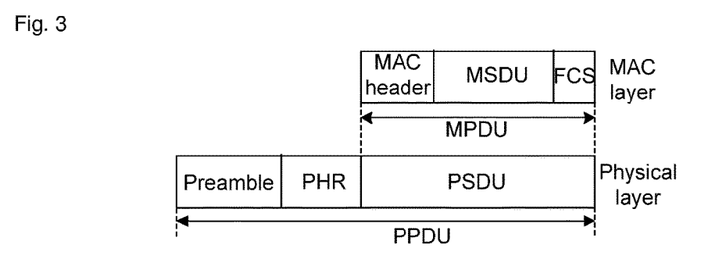
FIG. 3 is a schematic structural diagram of a frame of an MAC layer and a physical layer in standard Institute of Electrical and Electronic Engineers (IEEE) 802.15.7.

As shown in FIG. 3, the MPDU transmitted in the MAC layer includes the MSDU serving as the data part, an MAC header and a Frame Check Sequence (FCS).

Step 202: it is determined whether a length of the MSDU is less than or equal to a difference value between a maximum data length and a sum of a physical layer cost length and an MAC layer cost length, Step 203 is executed if YES, otherwise Step 210 is executed.

The difference value between the maximum data length and the sum of the physical layer cost length and the MAC layer cost length refers to a difference value obtained by sequentially subtracting the physical layer cost length and the MAC layer cost length from the maximum data length.

The maximum data length refers to a maximum data length which may be transmitted by a VLC sender within a period T, and is set to be $size_{max}$, and a numerical value of $size_{max}$ is shown in Formula (1):

$$size_{max} = T \times \text{data\_rate} \qquad (1)$$

In Formula (1), T is a reciprocal of a CFF, and data_rate is a data rate of a link; and the CFF is a minimum repetition frequency which may not cause a flicker feeling.

The physical layer cost length refers to a sum of a length of a Synchronization HeadeR (SHR) field and a length of a PHR field, and the MAC layer cost length refers to a sum of a length of an MHR field and a length of a MAC-layer tail field, i.e. an FCS field.

Step 203: it is determined whether an actual luminance value of a light source is equal to a target luminance value of the light source, Step 204 is executed if YES, otherwise Step 205 is executed.

Step 204: a PPDU is transmitted.

The MPDU in Step 201 is determined as a data part of the PPDU, that is, a PSDU is encapsulated into the PPDU transmitted in a physical layer, and the PPDU is transmitted.

In Step 203, when the actual luminance value of the light source is equal to the target luminance value of the light source, it is unnecessary to regulate the luminance value of the light source, so that when Step 204 is executed, as shown in FIG. 3, the MPDU in Step 201 is encapsulated into the PPDU transmitted in the physical layer as the data part of the PPDU (i.e. the PSDU), the PPDU further including a preamble and a PHR.

Step 205: a length of an Aggregated-MPDU (A-MPDU) generated by aggregating the MSDU and a CF is determined.

Figure 4:
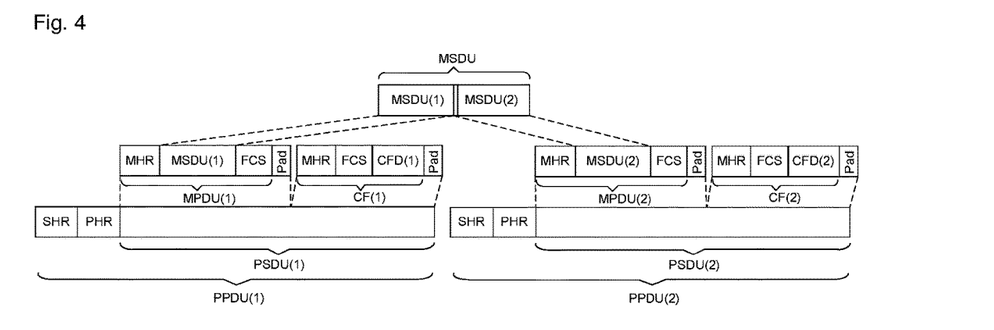
FIG. 4 is a schematic structural diagram of a PPDU according to an embodiment of the disclosure.

The CF and the MSDU are aggregated to generate the A-MPDU, of which the structure diagram is shown in FIG. 4, the A-MPDU is encapsulated into the data part of the PPDU (i.e. the PSDU) for transmission, MPDU (1) and corresponding CF (1) are aggregated into a data part of PPDU (1), i.e. PSDU (1), MPDU (2) and corresponding CF (2) are aggregated into a data part of PPDU (1), i.e. PSDU (2), and each of PPDU (1) and PPDU (2) includes a corresponding SHR field and PHR field; and each of MPDU (1) and MPDU (2) includes a corresponding MHR field, FCS field and pad field.

CFD in the CF is configured to regulate the luminance of the light source, the CF is configured to increase the luminance of the light source when the actual luminance value of the light source is lower than the target luminance value of the light source, and at this moment, the CFD is an all-"1" sequence, and the number of "1" is represented by $n_{CF}$; when the actual luminance value of the light source is more than the target luminance value of the light source, the CF is configured to decrease the luminance of the light source, and at this moment, the CFD is an all-"0" sequence, and the number of "0" is represented by $n_{CF}$; and a relationship between $n_{CF}$ and the target luminance value of the light source is shown in Formula (2):

$$\frac{n_{cost} + n_{MSDU} + n_{CF}}{size_{cost} + size_{MSDU} + size_{CF}} = \alpha \qquad (2)$$

In Formula (2), parameter $\alpha$ represents the target luminance value of the light source, $n_{cost}$ represents the number of "1" in a cost part, $n_{MSDU}$ represents the number of "1" in the MSDU, and $n_{CF}$ represents the number of "1" in the CFD part; cost represents cost except effective data, including an MHR field, a MAC-layer tail field, an SHR field, a PHR field, a CF header field and a pad field; $size_{cost}$ represents a length of the cost part, $size_{MSDU}$ represents a length of the MSDU, and $size_{CF}$ represents a length of the CF; pad is configured to align a 32-bit boundary, and consists of "0" and "1" sequences; and since the luminance of the light source is regulated through "1" or "0" sequences with different lengths in the embodiment, smooth regulation over the luminance of the corresponding light source is supported, that is, the amplitude may be set on a per regulation basis according to a practical requirement.

Figure 5:
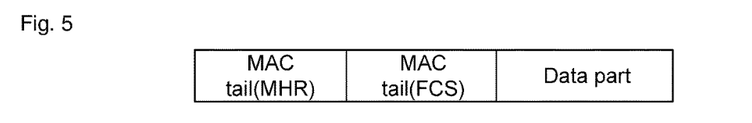
FIG. 5 is a schematic structural diagram of a Colour Visible Dimming (CVD) frame in standard IEEE 802.15.7.

In the embodiment of the disclosure, the CF configured for dimming may adopt a CVD frame format in standard IEEE 802.15.7, and as shown in FIG. 5, the MHR field includes control information of a CVD frame, the FCS field includes check information of an MACMHR, and a data part field includes a data content of the CVD frame. With reference to FIG. 4, the MHR field and FCS field of the CVD frame form a Compensatory Frame Header (CFH) of the CF, and the data part field of the CVD frame corresponds to a data part, i.e. the CFD, of the CF.

Determination of the CFD in the CF may be implemented by presetting all-"1" and all-"0" sequences with different lengths. When the CF is generated, a preset sequence with a corresponding length is directly endowed to the CF. If the length of the sequence is mismatched with the length of the determined CF, the preset sequences may be combined to obtain the data part of the determined CF. For example: all-"1" sequences with lengths of 100 bits, 200 bits and 400 bits are preset, and when CFs are generated, CFs with CFD lengths of 100 bits, 200 bits and 400 bits may be generated, and CF all"1" sequences with CFD lengths of 300 bits (that is, 200 bits are added to 100 bits), 500 bits (that is, 400 bits are added to 100 bits), 600 bits (that is, 400 bits are added to 200 bits) and 700 bits (that is, 200 bits and 400 bits are added to 100 bits) may also be generated.

Step 206: it is determined whether a length of the A-MPDU is less than a difference value between the maximum data length and the physical layer cost length, Step 209 is executed if YES, otherwise Step 207 is executed.

During a practical application, the CF length $size_{CF}$ calculated by Formula (2) is also required to meet the following formula:

$$size_{cost} + size_{MSDU} + size_{CF} \leq size_{max} \qquad (3)$$

In Formula (3), the maximum data length which may be transmitted every time during dimming with the CF is limited. If the CF length does not meet Formula (3), the problem of light source flicker that the user may feel may occur during transmission of the PPDU. This shows that the length of the MSDU or each sub-MSDU is excessive and the MSDU is required to be divided or the MSDU is required to be re-divided into shorter sub-MSDUs when the length of the A-MPDU is more than the difference value between the maximum data length $size_{MSDU}$ and the physical layer cost length $n_{cost}$.

Step 207: the MSDU is divided into multiple sub-MSDUs with an equal length.

Step 208: it is determined whether a length of each sub-MSDU is less than a difference value between the maximum data length and the sum of the physical layer cost length and the MAC layer cost length, Step 205 is executed if YES, otherwise Step 207 is executed.

When a determination result of Step 208 is NO and Step 207 is re-executed, a length of each sub-MSDU obtained by dividing the MSDU is smaller than the length of each sub-MSDU obtained by dividing the MSDU last time, that is, the MSDU is divided into $t_m$ sub-MSDUs with an equal length when Step 207 is executed for mth time, the MSDU is divided into $t_n$ sub-MSDUs with an equal length when Step 207 is executed for nth time, and when m is smaller than n, $t_n$ is more than $t_m$.

Step 209: the PPDU is transmitted.

After Step 207 is executed last time, the obtained sub-MSDUs are encapsulated into independent MPDUs respectively, and a CF is generated for each MPDU; and each MPDU and a CF corresponding to the each MPDU are aggregated into the A-MPDU, the A-MPDU is determined as a data part (i.e. PSDU) of the PPDU, and the PPDU is transmitted.

For example, when the MSDU in Step 201 is divided into MSDU (1) and MSDU (2) shown in FIG. 4 and the length of the A-MPDU generated by aggregation in Step 206 is smaller than the difference value between the maximum data length and the physical layer cost length, PPDU (1) and PPDU (2) shown in FIG. 4 are transmitted in the step.

When the length of the A-MPDU in Step 206 is more than the difference value between the maximum data length $size_{MSDU}$ and the physical layer cost length $n_{cost}$, it is indicated that the problem of light source flicker that the user may feel may not occur during data transmission, so that the A-MPDU is encapsulated into the data part of the PPDU (i.e. the PSDU) in Step 209, and the PPDU is transmitted.

Step 210: the MSDU is divided into multiple sub-MSDUs with an equal length.

Step 211: it is determined whether the length of the sub-MSDUs is smaller than the difference value between the maximum data length and the sum of the physical layer cost length and the MAC layer cost length, Step 212 is executed if YES, otherwise Step 210 is executed.

When a determination result of Step 211 is NO and Step 210 is re-executed, a length of each sub-MSDU obtained by dividing the MSDU is smaller than the length of the sub-MSDUs obtained by dividing the MSDU last time, that is, the MSDU is divided into $t_m$ sub-MSDUs with an equal length when Step 210 is executed for mth time, the MSDU is divided into $t_n$ sub-MSDUs with an equal length when Step 210 is executed for nth time, and when m is smaller than n, $t_n$ is more than $t_m$.

Step 212: it is determined whether the actual luminance value of the light source is equal to the target luminance value of the light source, Step 213 is executed if YES, otherwise Step 214 is executed.

Step 213: the PPDU is transmitted.

When the actual luminance value of the light source is equal to the target luminance value of the light source, it is unnecessary to regulate the luminance value of the light source, so that the sub-MSDUs obtained by executing Step 210 last time are encapsulated into the independent MPDUs respectively without generating a CF for each MPDU; and each encapsulated MPDU is determined as the PSDU part of the PPDU, and the PPDU is transmitted.

Step 214: the length of the A-MPDU generated by aggregation of the MDSU and the CF is determined.

Step 215: it is determined whether the length of the A-MPDU is smaller than the difference value between the maximum data length and the physical layer cost length, Step 216 is executed if YES, otherwise Step 217 is executed.

When the length of the A-MPDU is smaller than the difference value between the maximum data length and the physical layer cost length, it is indicated that the problem of light source flicker that human eyes may perceive may not occur when the A-MPDU is determined as the data part of the PPDU and the PSDU is transmittedf.

Step 216: the PPDU is transmitted.

The A-MPDU is determined as the data part of the PPDU (i.e. the PSDU), and the PPDU is transmitted.

Step 217: the MSDU is divided into multiple sub-MSDUs with an equal length, and Step 215 is executed.

The length of the sub-MSDUs obtained by dividing the MSDU in Step 217 is smaller than the length of each sub-MSDU obtained by dividing the MSDU before Step 217, and when Step 217 is repeatedly executed, the length of each sub-MSDU obtained every time when Step 217 is executed is smaller than the length of each sub-MSDU obtained when Step 217 is previously executed, and Step 217 is executed repeatedly until the length of an A-MPDU is smaller than the difference value between the maximum data length and the physical layer cost length when each obtained sub-MSDU and the corresponding CF are aggregated to obtain the A-MPDU, so that the phenomenon of light source flicker is avoided when the A-MPDU is transmitted as the data part of the PPDU (i.e. the PSDU).

The embodiment of the disclosure further describes a computer-readable medium having stored therein a computer-executable instruction being configured to execute the dimming method shown in FIG. 1 or execute the dimming method shown in FIG. 2.

Figure 6:
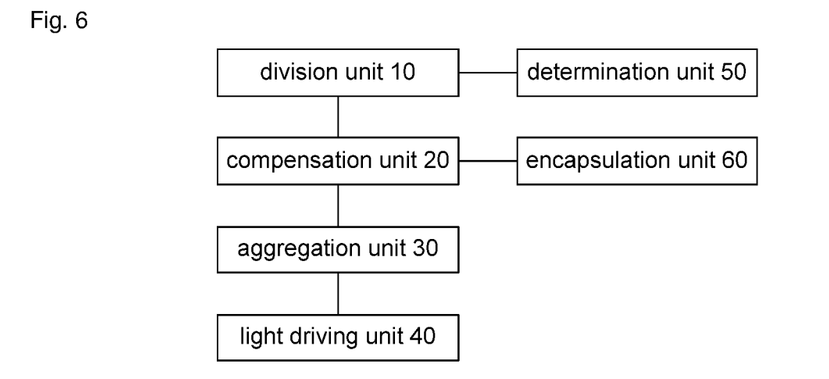
FIG. 6 is a schematic structural diagram of a dimming device according to an embodiment of the disclosure.

FIG. 6 is a schematic structural diagram of a dimming device according to an embodiment of the disclosure, the dimming device may be arranged in a sender of a VLC system, and may also be arranged in equipment independent from the sender, and as shown in FIG. 6, the dimming device includes:

a division unit 10, configured to divide an MSDU into multiple sub-MSDUs with an equal length in an MAC layer;

a compensation unit 20, configured to encapsulate the divided sub-MSDUs into independent MPDUs respectively, and generate a CF for each MPDU according to a target luminance value of a light source;

an aggregation unit 30, configured to aggregate each MPDU and a CF corresponding to the each MPDU into a PSDU in a PPDU; and a light driving unit 40, configured to transmit the generated PPDU.

In an embodiment, the dimming device further includes:

a determination unit 50, configured to, when determining that a length of the MSDU is less than or equal to a difference value between a maximum data length and a sum of a physical layer cost length and an MAC layer cost length, trigger the division unit 10.

In an embodiment, the maximum data length is a product of a period T and a data rate of a link, and the period T is a reciprocal of a CFF.

In an embodiment, the determination unit 50 is further configured to, when determining that the length of the MSDU is more than the difference value between the maximum data length and the sum of the physical layer cost length and the MAC layer cost length, trigger the division unit 10 to re-divide the MSDU into multiple sub-MSDUs with an equal length until the length of each obtained sub-MSDU is determined to be less than or equal to the difference value between the maximum data length and the sum of the physical layer cost length and the MAC layer cost length; and the division unit 10 is further configured to re-divide the MSDU into multiple sub-MSDUs with an equal length.

In an embodiment, the compensation unit 20 is further configured to, when an actual luminance value of the light source is determined to be different from a target luminance value of the light source, generate the CF for each MPDU according to the target luminance value of the light source.

In an embodiment, the compensation unit 20 is further configured to determine a length $n_{CF}$ of a sequence of a CFD part of each CF according to the following formula:

$$\frac{n_{cost} + n_{MSDU} + n_{CF}}{size_{cost} + size_{MSDU} + size_{CF}} = \alpha$$

where α represents the target luminance value of the light source, $n_{cost}$ represents the number of "1" in a cost part, $n_{MSDU}$ represents the number of "1" in the MSDU, and $n_{CF}$ represents the number of "1" in the CFD part; $size_{cost}$ represents a length of the cost part, $size_{MDSU}$ represents the length of the MSDU, and $size_{CF}$ represents a length of the CF; and cost includes an MHR field, a MAC-layer tail field, a physical-layer preamble field, a PHR field, a CF header field and a pad field.

In an embodiment, the dimming device further includes:

an encapsulation unit 60, configured to, when the actual luminance value of the light source is determined to be the same as the target luminance value of the light source, encapsulate the divided sub-MSDUs into the independent MPDUs respectively; and the light driving unit 40 is further configured to determine each MPDU as the PSDU of the PPDU, and transmit the PPDU.

In an embodiment, the determination unit 50 is further configured to, after each MPDU and the CF corresponding to the each MPDU are aggregated into the PSDU in the PPDU, determine whether a length of the PSDU obtained by aggregation is less than or equal to a difference value between the maximum data length and the physical layer cost length.

In an embodiment, the determination unit 50 is further configured to, when the length of the PSDU obtained by aggregation is determined to be more than the difference value between the maximum data length and the physical layer cost length, trigger the division unit 10 to re-divide the MSDU into multiple sub-MSDUs with an equal length until the length of the PSDU obtained by the aggregation unit 30 through aggregation of each sub-MSDU obtained by the division unit 10 and the CF corresponding to the each sub-MSDUs is less than or equal to the difference value between the maximum data length and the physical layer cost length.

During a practical application, all of the modules in the dimming device may be implemented by a Central Processing Unit (CPU), micro processing unit or Field-Programmable Gate Array (FPGA) in the dimming device.

From the above, according to the technical solutions for dimming in the embodiment of the disclosure, the sub-MSDUs divided in the MAC layer are encapsulated in the MPDUs, and the CFs in each MPDU include target luminance information of the light source, so that corresponding CFs may be generated for different target luminance of the light source, the shortcoming that luminance may be regulated to a set extent only in the related technology is overcome, the luminance of the light source may be smoothly regulated, and dimming flexibility is ensured.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of patent of the disclosure.

What is claimed is:

1. A dimming method, comprising:
    dividing a Media Access Control (MAC) Service Data Unit (MSDU) into multiple sub-MSDUs with an equal length in a MAC layer;
    encapsulating the divided sub-MSDUs into independent MAC Protocol Data Units (MPDUs) respectively, and generating a Compensatory Frame (CF) for each MPDU according to a target luminance value of a light source; and
    aggregating each MPDU and a CF corresponding to the each MPDU into a Physical-layer Service Data Unit (PSDU) in a Physical-layer Protocol Data Unit (PPDU), and transmitting the PPDU,
    wherein the dimming method further comprises: before dividing the MSDU into the multiple sub-MSDUs with the equal length in the MAC layer,
    determining whether a length of the MSDU is less than or equal to a difference in value between a maximum data length and a sum of a physical layer cost length and a MAC layer cost length, wherein the maximum data length is a product of a period T and a data rate of a link, and the period T is a reciprocal of a Critical Flicker Frequency (CFF).

2. The method according to claim 1, further comprising:
    when the length of the MSDU is determined to be more than the difference in value between the maximum data length and the sum of the physical layer cost length and the MAC layer cost length,
    re-dividing the MSDU into multiple sub-MSDUs with an equal length until the length of each obtained sub-MSDU is determined to be less than or equal to the difference in value between the maximum data length and the sum of the physical layer cost length and the MAC layer cost length.

3. The method according to claim 2, wherein generating the CF for each MPDU according to the target luminance value of the light source comprises:
    generating the CF for each MPDU according to the target luminance value of the light source when an actual luminance value of the light source is determined to be different from the target luminance value of the light source.

4. The method according to claim 3, wherein generating the CF for each MPDU according to the target luminance value of the light source when the actual luminance value of the light source is determined to be different from the target luminance value of the light source comprises:

determining a length $n_{CF}$ of a sequence of a Compensatory Frame Data (CFD) part of each CF according to the following formula:

$$\frac{n_{cost} + n_{MSDU} + n_{CF}}{size_{cost} + size_{MSDU} + size_{CF}} = \alpha$$

where α represents the target luminance value of the light source, $n_{cost}$ represents the number of "1" in a cost part, $n_{MSDU}$ represents the number of "1" in the MSDU, and $n_{CF}$ represents the number of "1" in the CFD part; $size_{cost}$ represents a length of the cost part, $size_{MSDU}$ represents the length of the MSDU, and $size_{CF}$ represents a length of the CF; and cost comprises a MAC-layer HeadeR (MHR) field, a MAC-layer tail field, a physical-layer preamble field, a Physical-layer HeadeR (PHR) field, a CF header field and a pad field.

5. The method according to claim 3, further comprising: when the actual luminance value of the light source is determined to be the same as the target luminance value of the light source, encapsulating the divided sub-MSDUs into the independent MPDUs respectively; and determining each MPDU as the PSDU of the PPDU, and transmitting the PPDU.

6. The method according to claim 3, further comprising: after aggregating each MPDU and the CF corresponding to the each MPDU into the PSDU in the PPDU, determining whether a length of the PSDU obtained by aggregation is less than or equal to a difference in value between the maximum data length and the physical layer cost length.

7. The method according to claim 6, further comprising: when the length of the PSDU obtained by aggregation is determined to be more than the difference in value between the maximum data length and the physical layer cost length, re-dividing the MSDU into multiple sub-MSDUs with an equal length until the length of the PSDU obtained by aggregation according to each obtained sub-MSDU and a CF corresponding to the each sub-MSDU is less than or equal to the difference in value between the maximum data length and the physical layer cost length.

8. A dimming device, comprising:
a memory storing processor-executable instructions; and
a processor arranged to execute the stored processor-executable instructions to perform steps of:
dividing a Media Access Control (MAC) Service Data Unit (MSDU) into multiple sub-MSDUs with an equal length in a MAC layer;
encapsulating the divided sub-MSDUs into independent MAC Protocol Data Units (MPDUs) respectively, and generate a Compensatory Frame (CF) for each MPDU according to a target luminance value of a light source;
aggregating each MPDU and a CF corresponding to the each MPDU into a Physical-layer Service Data Unit (PSDU) in a Physical-layer Protocol Data Unit (PPDU), and transmitting the PPDU,
wherein the processor is arranged to execute the stored processor-executable instructions to further perform a step of:
before dividing the MSDU into the multiple sub-MSDUs with the equal length in the MAC layer, determining whether a length of the MSDU is less than or equal to a difference in value between a maximum data length and a sum of a physical layer cost length and a MAC layer cost length, wherein the maximum data length is a product of a period T and a data rate of a link, and the period T is a reciprocal of a Critical Flicker Frequency (CFF).

9. The dimming device according to claim 8, wherein the processor is arranged to execute the stored processor-executable instructions to further perform a step of:
when the length of the MSDU is determined to be more than the difference in value between the maximum data length and the sum of the physical layer cost length and the MAC layer cost length, dividing the MSDU into multiple sub-MSDUs with an equal length until the length of each obtained sub-MSDU is determined to be less than or equal to the difference in value between the maximum data length and the sum of the physical layer cost length and the MAC layer cost length.

10. The dimming device according to claim 9, wherein generating the CF for each MPDU according to the target luminance value of the light source comprises:
generating the CF for each MPDU according to the target luminance value of the light source when an actual luminance value of the light source is determined to be different from the target luminance value of the light source.

11. The dimming device according to claim 10, wherein generating the CF for each MPDU according to the target luminance value of the light source when the actual luminance value of the light source is determined to be different from the target luminance value of the light source comprises:
determining a length $n_{CF}$ of a sequence of a Compensatory Frame Data (CFD) part of each CF according to the following formula:

$$\frac{n_{cost} + n_{MSDU} + n_{CF}}{size_{cost} + size_{MSDU} + size_{CF}} = \alpha$$

where α represents the target luminance value of the light source, $n_{cost}$ represents the number of "1" in a cost part, $n_{MSDU}$ represents the number of "1" in the MSDU, and $n_{CF}$ represents the number of "1" in the CFD part; $size_{cost}$ represents a length of the cost part, $size_{MSDU}$ represents the length of the MSDU, and $size_{CF}$ represents a length of the CF; and cost comprises a MAC-layer HeadeR (MHR) field, a MAC-layer tail field, a physical-layer preamble field, a Physical-layer HeadeR (PHR) field, a CF header field and a pad field.

12. The dimming device according to claim 10, wherein the processor is arranged to execute the stored processor-executable instructions to further perform steps of:
when the actual luminance value of the light source is determined to be the same as the target luminance value of the light source, encapsulating the divided sub-MSDUs into the independent MPDUs respectively;
determining each MPDU as the PSDU of the PPDU, and transmitting the PPDU.

13. The dimming device according to claim 10, wherein the processor is arranged to execute the stored processor-executable instructions to further perform a step of:
after aggregating each MPDU and the CF corresponding to the each MPDU into the PSDU in the PPDU, determining whether a length of the PSDU obtained by aggregation is less than or equal to a difference in value between the maximum data length and the physical layer cost length.

14. The dimming device according to claim 13, wherein the processor is arranged to execute the stored processor-executable instructions to further perform a step of:

when the length of the PSDU obtained by aggregation is determined to be more than the difference in value between the maximum data length and the physical layer cost length, re-dividing the MSDU into multiple sub-MSDUs with an equal length until the length of the PSDU obtained by aggregation according to each obtained sub-MSDU and a CF corresponding to the each sub-MSDU is less than or equal to the difference in value between the maximum data length and the physical layer cost length.

15. A non-transitory computer storage medium having stored therein a computer-executable instruction being configured to execute a dimming method, the dimming method comprising:

dividing a Media Access Control (MAC) Service Data Unit (MSDU) into multiple sub-MSDUs with an equal length in a MAC layer;

encapsulating the divided sub-MSDUs into independent MAC Protocol Data Units (MPDUs) respectively, and generating a Compensatory Frame (CF) for each MPDU according to a target luminance value of a light source; and aggregating each MPDU and a CF corresponding to the each MPDU into a Physical-layer Service Data Unit (PSDU) in a Physical-layer Protocol Data Unit (PPDU), and transmitting the PPDU, wherein the dimming method further comprises: before dividing the MSDU into the multiple sub-MSDUs with the equal length in the MAC layer, determining whether a length of the MSDU is less than or equal to a difference in value between a maximum data length and a sum of a physical layer cost length and a MAC layer cost length, wherein the maximum data length is a product of a period T and a data rate of a link, and the period T is a reciprocal of a Critical Flicker Frequency (CFF).

\* \* \* \* \*